(No Model.)
M. E. CARLETON.
IMPLEMENT HANDLE.
No. 473,250. Patented Apr. 19, 1892.
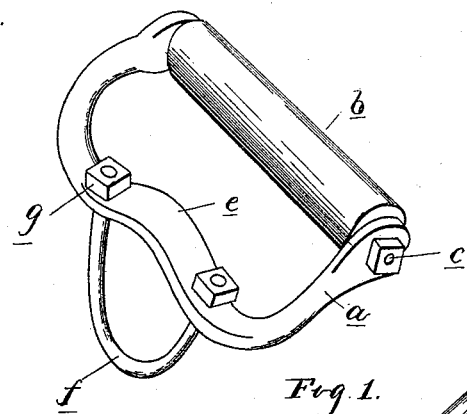
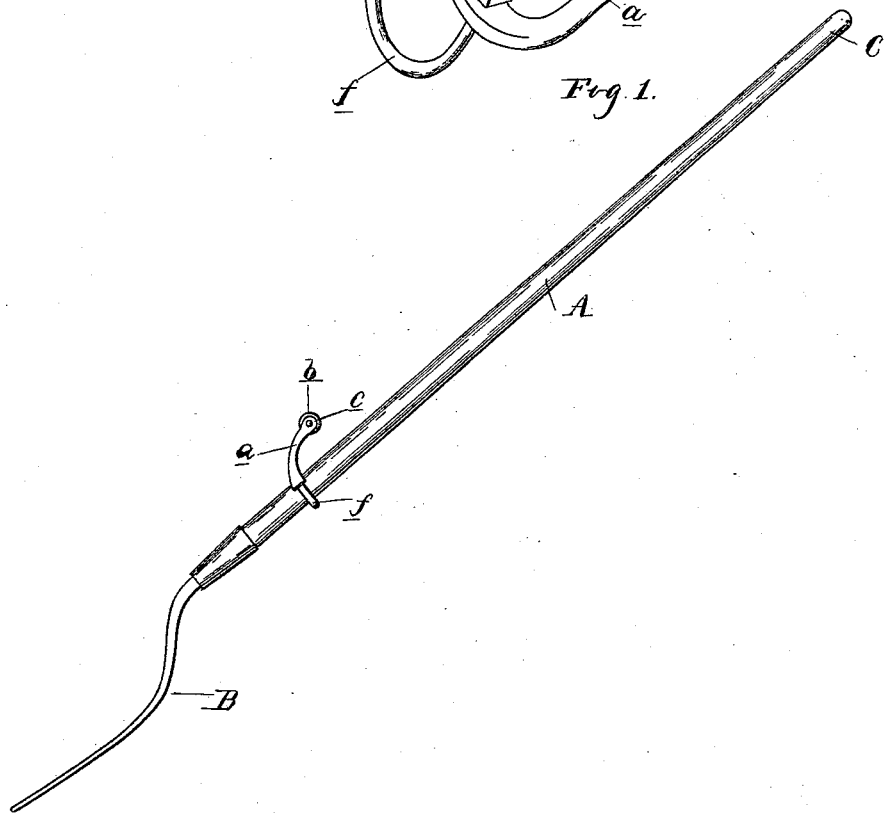
Witnesses
P. M. Hulbert
M. B. O'Dogherty
Inventor
Milton E. Carleton
By Thos. L. Sprague & Son,
Attys.

UNITED STATES PATENT OFFICE.

MILTON E. CARLETON, OF CANTON, MICHIGAN.

IMPLEMENT-HANDLE.

SPECIFICATION forming part of Letters Patent No. 473,250, dated April 19, 1892.

Application filed May 27, 1891. Serial No. 394,313. (No model.)

*To all whom it may concern:*

Be it known that I, MILTON E. CARLETON, a citizen of the United States, residing at Canton, in the county of Wayne and State of Michigan, have invented certain new and useful Improvements in Implement Handles, of which the following is a specification, reference being had therein to the accompanying drawings.

This invention relates to new and useful improvements in implement-handles; and it consists in the peculiar construction of an improved auxiliary handle adapted to be applied to an ordinary implement, such as a fork, shovel, spade, &c.

The invention further consists in the peculiar construction, arrangement, and combination of the various parts, all as more fully hereinafter described.

In the drawings, Figure 1 is a side elevation of a fork to which my invention is applied. Fig. 2 is a detached perspective view of the auxiliary handle.

A is the handle of the fork; B, the tines; C, the hand-hold at the top thereof. In the use of such a fork as this, or in the use of a spade or shovel, the operator must grasp the handle C with one hand and take hold of the handle of the fork near the tines with the other. In taking hold of an implement in that way the forward or lower hand approaches the handle parallel to the ground and necessitates, therefore, that a very tight grip should be taken to lift a load, and the power is applied in the most inconvenient manner. To overcome this mode of using such an implement, I attach to the handle A an auxiliary handle, so constructed that the operator can grasp it from the top and sustain the load or do his lifting directly in line with the application of the power.

I form the auxiliary handle in the following manner: $a$ is an open link, between the ends of which is pivoted the ferrule $b$ upon the bolt $c$. This link is provided with an upwardly-curved bearing $e$ at its middle, and upon each side of this bearing it is apertured to receive the upper ends of the stirrup $f$, secured in position by means of the nuts $g$. To secure this auxiliary handle to the handle, the nuts $g$ are removed, the stirrup or yoke $f$ detached, and the bearing $e$ is placed upon the handle at the point where it is desired to be secured. The stirrup is then inserted with one arm on each side of the handle, the nuts replaced and turned up tightly, firmly clamping the device in position. By simply loosening the nuts the device may be adjusted to any point of the length of the handle. The handle extends rearwardly as well as upwardly, so that the nuts $g$ can be readily reached at any time with any kind of an instrument, and also I have found by experiment that this gives me a better leverage to work with.

What I claim as my invention is—

As an improved article of manufacture, an auxiliary handle consisting of an open link having two side bars extending obliquely upward, a connecting-bar between the lower ends of the side bars having an upwardly-curved central portion and vertical apertures on opposite sides of the curve, a U-shaped stirrup having its ends inserted through the apertures, nuts on the projecting ends of the stirrup, and a cylindrical hand-piece pivoted between the upper ends of the side bars, substantially as described.

In testimony whereof I affix my signature in presence of two witnesses.

MILTON E. CARLETON.

Witnesses:
M. B. O'DOGHERTY,
N. L. LINDOP.